US008448835B2

(12) United States Patent
Larsson

(10) Patent No.: US 8,448,835 B2
(45) Date of Patent: May 28, 2013

(54) DEVICE FOR WELDING

(75) Inventor: Håkan Larsson, Laxå (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 13/059,778

(22) PCT Filed: Jun. 23, 2009

(86) PCT No.: PCT/SE2009/050792
§ 371 (c)(1),
(2), (4) Date: Mar. 9, 2011

(87) PCT Pub. No.: WO2010/021583
PCT Pub. Date: Feb. 25, 2010

(65) Prior Publication Data
US 2011/0163151 A1 Jul. 7, 2011

(30) Foreign Application Priority Data

Aug. 21, 2008 (SE) ...................... 0801817

(51) Int. Cl.
B23K 1/00 (2006.01)
(52) U.S. Cl.
USPC .................................. 228/25; 228/32; 228/45
(58) Field of Classification Search
USPC ........................................................ 228/25
See application file for complete search history.

(56) References Cited

U.S. PATENT DOCUMENTS

| 2,644,067 | A | * | 6/1953 | Watson | 219/86.21 |
| 3,031,566 | A | | 4/1962 | Wuesthoff | |
| 3,367,512 | A | * | 2/1968 | Kaplan | 212/294 |
| 4,267,424 | A | * | 5/1981 | Shimatake et al. | 219/86.41 |
| 4,577,089 | A | | 3/1986 | Olson et al. | |
| 4,744,499 | A | | 5/1988 | Johnson et al. | |
| 5,704,498 | A | * | 1/1998 | Smith et al. | 212/231 |
| 5,769,251 | A | | 6/1998 | Wada et al. | |
| 6,099,227 | A | * | 8/2000 | Shellhammer | 414/24.5 |

FOREIGN PATENT DOCUMENTS

| DE | 20013143 U1 | 12/2000 |
| EP | 0506245 A2 | 9/1992 |
| EP | 0890409 A2 | 1/1999 |
| EP | 1050362 A1 | 11/2000 |
| EP | 1293284 A1 | 3/2003 |
| GB | 596204 | 12/1947 |
| GB | 1582328 | 1/1981 |
| GB | 2330097 A | 10/1997 |
| JP | 05293780 | 11/1993 |
| WO | 2006005553 A1 | 1/2006 |
| WO | 2009113960 A1 | 9/2009 |

OTHER PUBLICATIONS www.dictionary.com; "Sheave".*
Mast definition Random House Dictionary; www.dictionary.com.*
Swedish Patent Office, PCT International Search Report for National Application No. 0801817-8 dated Jan. 30, 2009.
European Patent Office, PCT International Preliminary Report on Patentability and Written Opinion of the International Searching Authority for International Application No. PCT/SE2009/050792 dated Feb. 22, 2011.

* cited by examiner

Primary Examiner — Erin Saad
(74) Attorney, Agent, or Firm — Kacvinsky Daisak PLLC

(57) ABSTRACT

A welding crane (1) for welding large structures is described. The welding crane (1) comprises a base part (2) which is arranged to be positioned on a ground (3), a mast (4) with a longitudinal axis (5). The mast (4) can be arranged in at least a first position in which the longitudinal axis (5) of the mast (4) extends substantially vertically from the base part (2). A boom (6) with a longitudinal axis (7) is arranged on the mast. The boom (6) can be arranged in at least a first position in which the longitudinal axis (7) of the boom (6) is substantially perpendicular to the longitudinal axis (5) of the mast (4). The boom (6) is arranged for receiving a welding head (13). The boom (6) is rotatable in relation to the mast (4) such that the boom (6) can be arranged in a second position in which the longitudinal axis (7) of the boom (6) is substantially parallel with the longitudinal axis (5) of the mast (4).

20 Claims, 4 Drawing Sheets

DEVICE FOR WELDING

CROSS-REFERENCE TO RELATED APPLICATIONS

This application is filed under the provisions of 35 U.S.C. §371 and claims the benefit of International Patent Application No. PCT/SE2009/050792, filed on Jun. 23, 2009 entitled "Device for Welding" in the name of Hakan Larsson, which claims priority of Swedish Patent Application No. 0801817-8, filed on Aug. 21, 2008, both of which are hereby incorporated by reference herein in their entirety.

TECHNICAL FIELD

The present invention relates to a device for welding. In particular, the present invention concerns a device for welding large structures and in particular such a device which is easy to transport.

DESCRIPTION OF PRIOR ART

The present invention relates to a device for welding large structures. When welding large structures a so-called welding crane can be used which comprises a base part which is arranged to be positioned on a ground, a mast, which is arranged to extend vertically from the ground, and a boom which is arranged to extend substantially perpendicularly to the mast. At the end of the boom a welding head is arranged. Such welding cranes are usually positioned in factory premises in which the structures are welded together in order to thereafter be transported from the factory to the orderer.

Wind power plants comprise a tower and a propeller. In order to achieve a high output power, the propeller must be made large, which leads to the fact that the towers must be high. It is becoming more and more common to use wind power plants that are so large that the towers must be assembled at its place of operation. Such wind power plant towers are nowadays usually assembled by screwing together several smaller sections. The size of the sections is selected such that they can be transported on a road. For different reasons it is however advantageous to weld together the sections instead of using screw joints. The welding of the sections for a wind power plant tower does however require a large welding crane. Before the welding, the welding crane must be transported to the place of operation and must be arranged for welding, which arrangement may include assembling the welding crane since large welding cranes can be difficult to transport on a road. After that the welding is finished, the welding crane should thereafter be disassembled and trans-ported to another place of operation for welding together another wind power tower. It is however time demanding and thereby also expensive to assemble and disassemble welding cranes at the place of operation of a wind power plant.

There exist also other applications in addition to wind power plants at which it is desirable to weld together a large structure at its place of operation and which require the use of a large welding crane.

SUMMARY OF THE INVENTION

An object of the present invention is to provide a welding crane which at least partly solves some of the problems of the prior art.

A further object of the present invention is to provide a welding crane comprising a mast and a boom which is easier to transport and to prepare for welding at a place of operation for the structure which is to be welded.

At least one of these objects is obtained with a welding device and a method according to the appended independent claim.

Further advantages of the invention are achieved by the features of the dependent claims.

A fundamental idea of the present invention is to let the boom in a welding crane be rotatable in relation to the mast such that the welding crane can more easily be transported to the place of operation without having to be disassembled.

Welding cranes according to the invention have a mast which is at least one meter long and a boom which is at least one meter long.

According to a first aspect of the invention a welding crane is provided for welding large structures. The welding crane comprises a base part which is arranged to be positioned on a ground and a mast with a longitudinal axis. The mast can be arranged in at least a first position in which the longitudinal axis of the mast extends substantially vertically from the base part. The welding crane also comprises a boom with a longitudinal axis, which boom is arranged on the mast. The boom can be arranged in at least a first position in which the longitudinal axis of the boom is substantially perpendicular to the longitudinal axis of the mast, and is arranged for receiving a welding head in a first end. The welding crane is characterized in that the boom is rotatable in relation to the mast such that the boom can be arranged in a second position in which the longitudinal axis of the boom is substantially parallel with the longitudinal axis of the mast.

With a welding crane according to the invention, transport and erection of the welding crane are facilitated. Since the boom is rotatable to the second position where the boom is parallel with the mast, the welding crane becomes essentially less space demanding and can be more easily transported with a truck to the place of operation for the structure that is to be welded. Since the boom is rotatable in relation to the mast, the boom can easily be rotated to its first position when the welding crane has been positioned at the place of operation for the structure to be welded. The same is the case for returning to the second position when the welding is terminated.

The welding crane may comprise a first member which is arranged on the mast, wherein the boom is rotatable in relation to the first member. The member may for example be a plate that is attached to the mast. Such an arrangement facilitates the implementation of a movable attachment point for the boom in the mast.

The first member may be displaceable along the longitudinal axis of the mast. By letting the first member be displaceable along the longitudinal axis of the mast, the welding height can easily be varied by raising and lowering the first member. The first member is arranged for the attachment of the boom and can be arranged to run in a track (50) on the mast. The first member may comprise a plate. The displacement of the first member along the mast can be achieved by a lift motor.

The welding crane may comprise a second member, wherein the boom is arranged on the second member, which is rotatably arranged in relation to the first member.

The boom may be displaceable perpendicularly to the longitudinal axis of the mast. This provides a possibility to change the position of the welding point in relation to the longitudinal axis of the mast. In the case that the welding crane comprises a second member according to the above, the boom is displaceable in relation to the second member.

The boom may have the ability to be telescopically pulled out along its longitudinal axis. In this manner, a possibility is provided for changing the position of the welding point in relation to the longitudinal axis of the mast. A telescopic boom may with advantage be combined with a displaceable boom.

The base part may comprise support points which define a support surface, which is arranged to be positioned substantially in a horizontal plane, wherein the mast is arranged such that it can be folded from its first position to a second position in which the longitudinal axis of the mast is substantially parallel with the horizontal plane of the support surface. By letting the mast be foldable in relation to the base part, the physical extension of the welding crane can be further reduced, whereby transports of the welding crane are further facilitated.

The mast may in its in relation to the base part distal end be provided with support wheels. In this manner it is easier to move the welding crane when the mast is in its second position, that is folded in relation to the base part.

The welding crane may comprise a mast base member on which the mast is arranged and in relation to which the mast can be folded, wherein the mast base member is rotatable in relation to the base part around a rotational axis which is perpendicular to the support surface. The rotatable mast base member facilitates folding the mast in relation to the base part since the mast can then, before folding the mast, be rotated to the for the folding most advantageous position.

The base part may be provided with wheels. The wheels facilitate the movement of the welding crane during the welding, which is an advantage when welding structures that are too large to be moved during the welding. The wheels also facilitate the transport of the welding crane.

In the following preferred embodiments of the invention will be described with reference to the appended drawings.

DESCRIPTION OF PREFERRED EMBODIMENTS OF THE INVENTION

In the following description of preferred embodiments of the invention similar parts in the different figures will be designated by the same reference signs.

Figure 1:
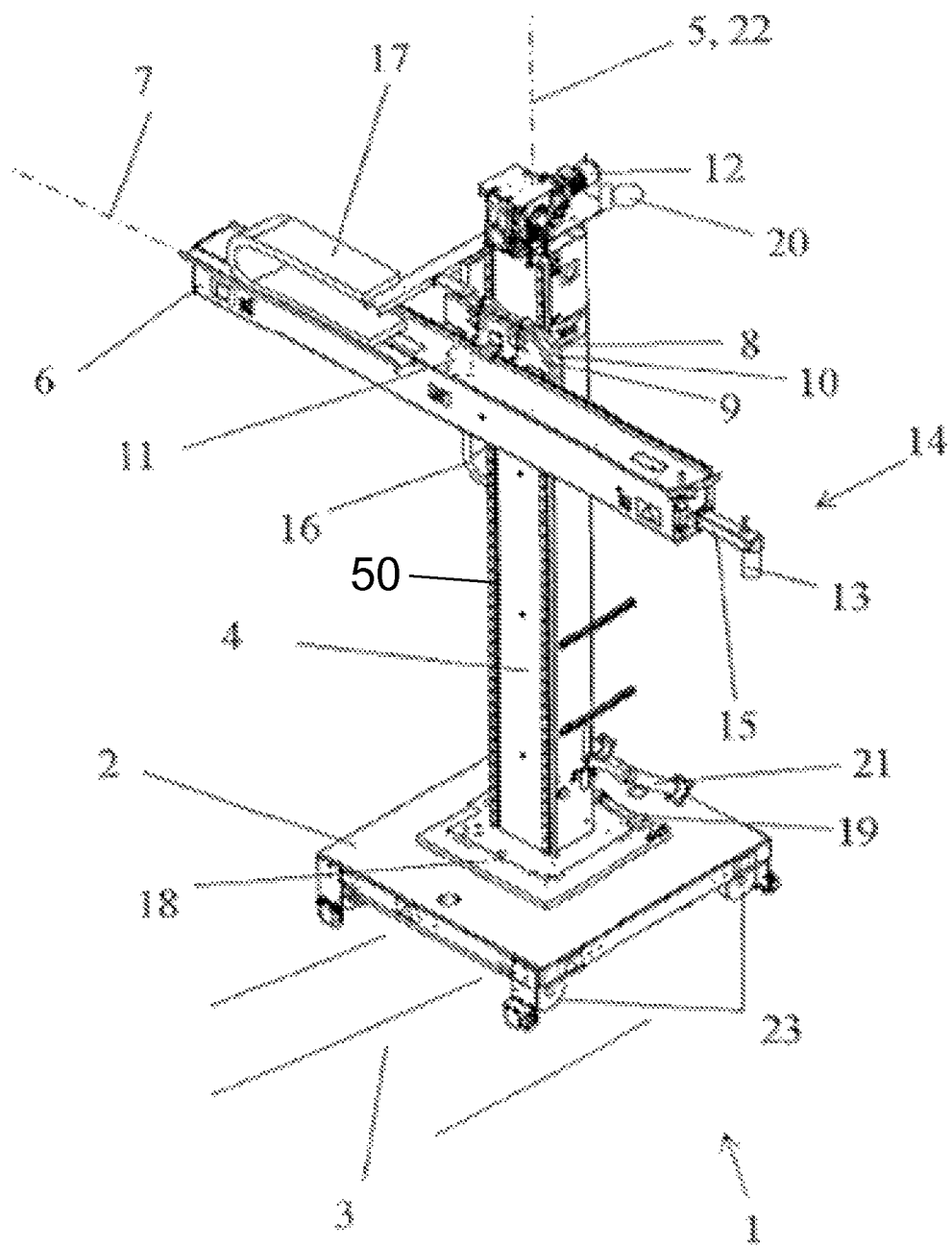
FIG. 1 shows schematically a welding device according to an embodiment of the present invention.
Figure 2:
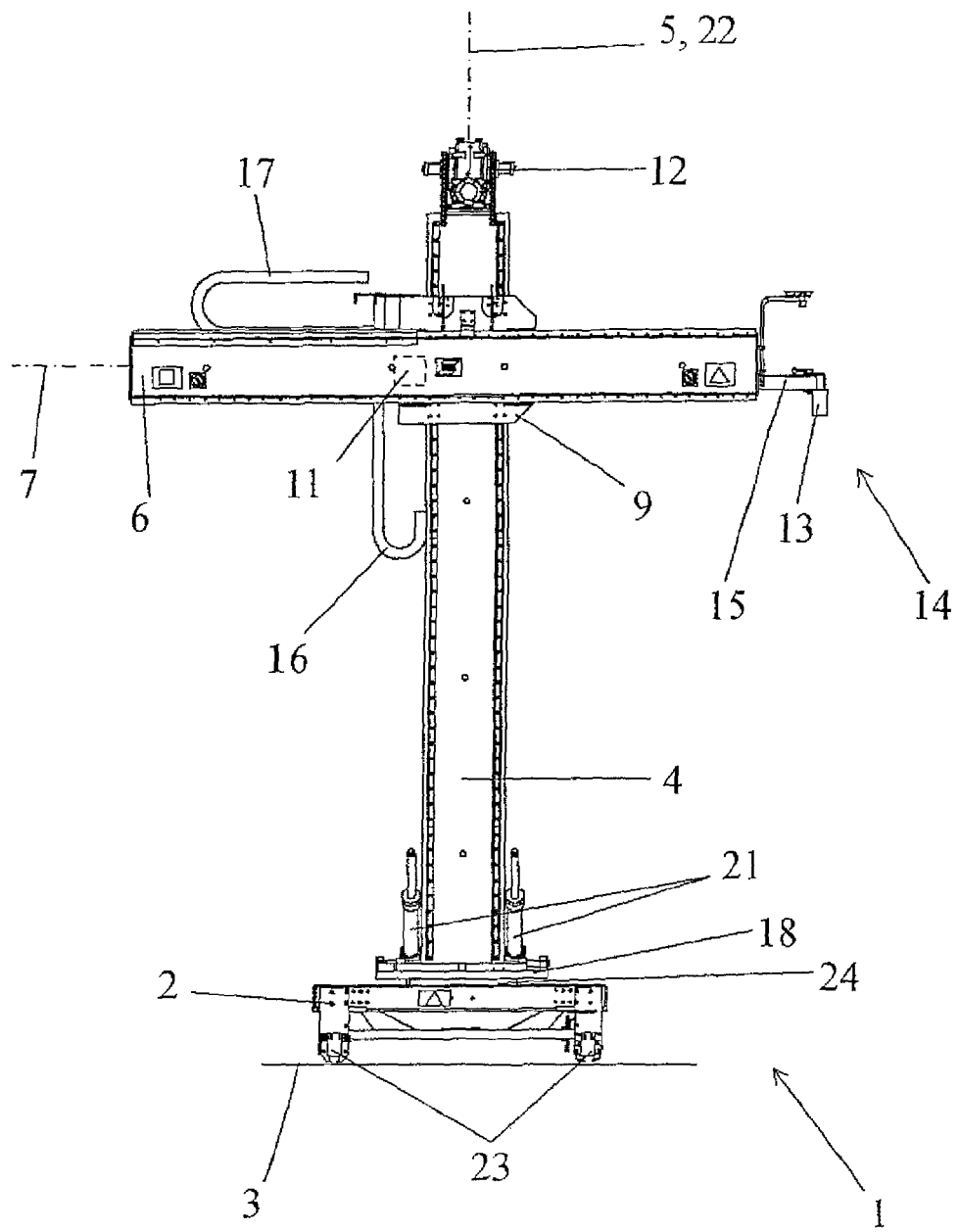
FIG. 2 shows the welding crane of FIG. 1 in a side view

FIG. 1 shows schematically in an inclined view from above a welding crane 1 for welding large structures. Preferably structures which have at least an extension of 1 meter in at least one direction, and in particular such structures which have an extension of at least 1 meter in at least two directions. FIG. 2 shows the welding crane 1 in a side view.

The welding crane 1 comprises a base part 2 which is arranged to be positioned on a ground 3, a mast 4 with a longitudinal axis 5, wherein the mast 4 can be arranged in at least a first position in which the longitudinal axis 5 of the mast 4 extends substantially vertically from the base part 2. The welding crane 1 also comprises a boom 6 with a longitudinal axis 7. A first member 8 comprising a first plate is arranged such that it can be raised and lowered in relation to the mast 4. The boom 6 is arranged on a second member 9 comprising a second plate and is movable along the longitudinal axis 7 of the boom in relation to the second member 9. The second member 9 is connected to the first member 8 by means of a roller path bearing 10 which enables rotation of the second member and of the boom 6 in relation to the first member 8. The rotation may be caused manually or alternatively with a motor that is not shown in FIG. 1.

A translation motor 11 is arranged inside the boom 6 for moving the boom 6 in relation to second plate 9. A lift motor 12 is arranged on the mast for raising and lowering the first plate 8 and the boom 6. The boom 6 can be arranged in at least a first position, which is shown in FIG. 1, and in which the longitudinal axis 7 of the boom 6 is substantially perpendicular to the longitudinal axis 5 of the mast 4. The boom 6 is arranged for receiving a welding head 13 in a first end 14. Because of the roller path bearing 10, the second member 9 can be rotated in relation to the first member 8 and the boom 6 can thereby be rotated to a second position in which the longitudinal axis of the boom 6 is substantially parallel with the longitudinal axis 5 of the mast 4.

Except for being displaceable in relation to the mast 4, the boom 6 may also be telescopic. In FIG. 1 an inner part 15 of the boom 6 is seen which can be pushed out from the boom 6. By pushing out the inner part 15, the welding head 13 can thus be displaced in relation to the mast 4. Voltage is conducted to the welding head 13 via a first cable carrier 16 that is arranged between the mast and the first member 8 and by a second cable carrier 17 that is arranged between the first member 8 and the boom 6.

Figure 3:
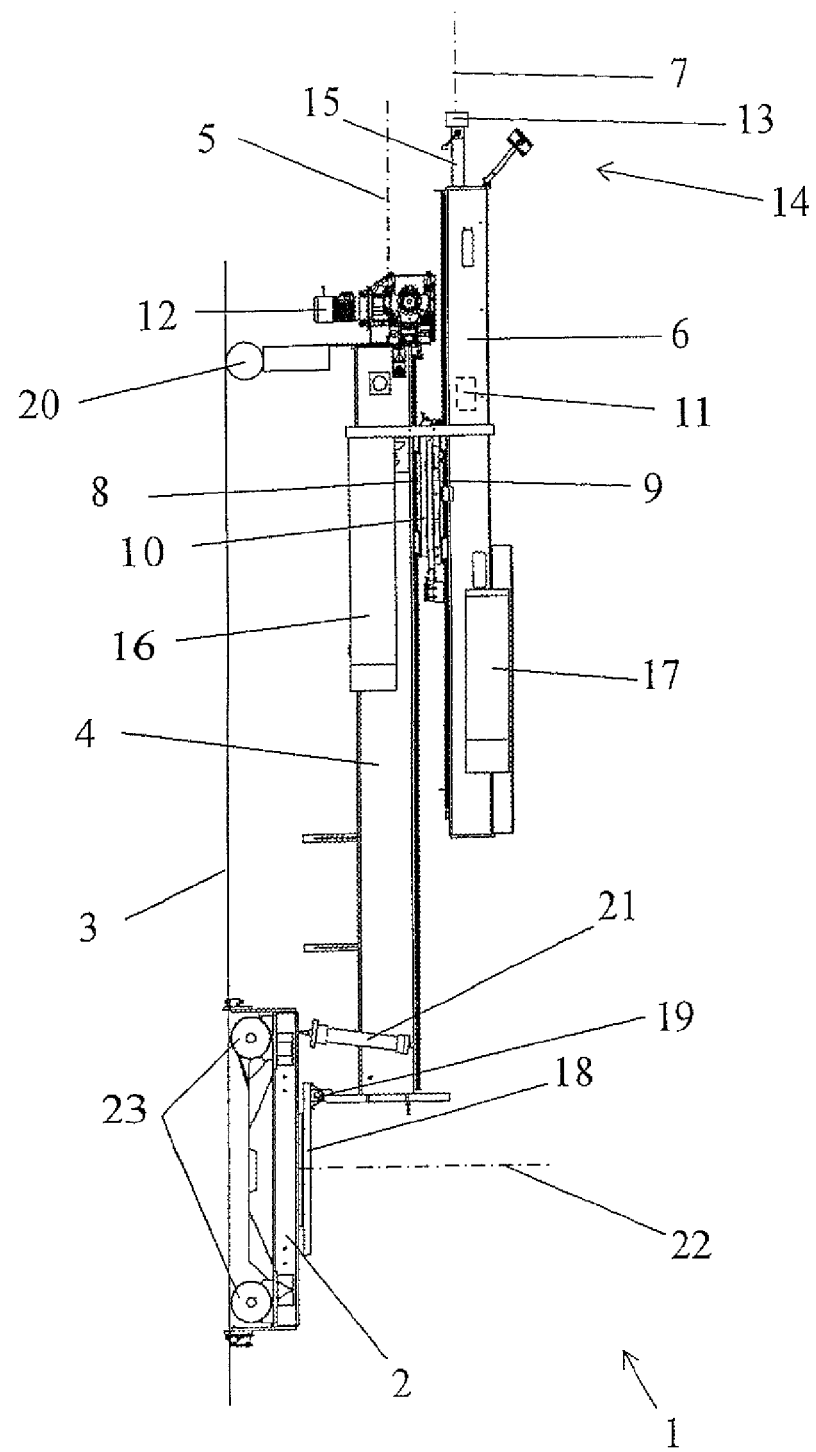
FIG. 3 shows the welding crane of FIG. 1 and FIG. 2 when the boom and the mast have been positioned in there second positions.

The base part 2 is provided with wheels 23 which are arranged for running along rails. The wheels 23 constitute support points which define a support surface and is arranged to during operation be positioned substantially in a horizontal plane. On the base part a mast base member 18 is provided which is rotatable in relation to the base part around a rotational axis 22 which is perpendicular to the support surface which is defined by the wheels 23. In the first position for the mast 4 which is shown in FIG. 1 said rotational axis 22 coincides with the longitudinal axis 5 of the mast. For this purpose, a roller path bearing 24 (FIG. 2) is provided between the base part 2 and the mast base member 18. The mast 4 is attached at the mast base member 18 by means of a hinge 19. Because of the hinge 19, the mast can be folded from its first vertical position which is shown in FIGS. 1 and 2 to a second substantially horizontal position which is shown in FIG. 3. A hydraulic cylinder 21 is arranged between the base part 2 and the mast 4 for folding the mast 4.

The mast 4 is in its, in relation to the base part 2, distal end provided with support wheels 20 which support the mast 4 when it is in its second position.

The function of the welding crane according to the described embodiments will now be described.

Figure 4:
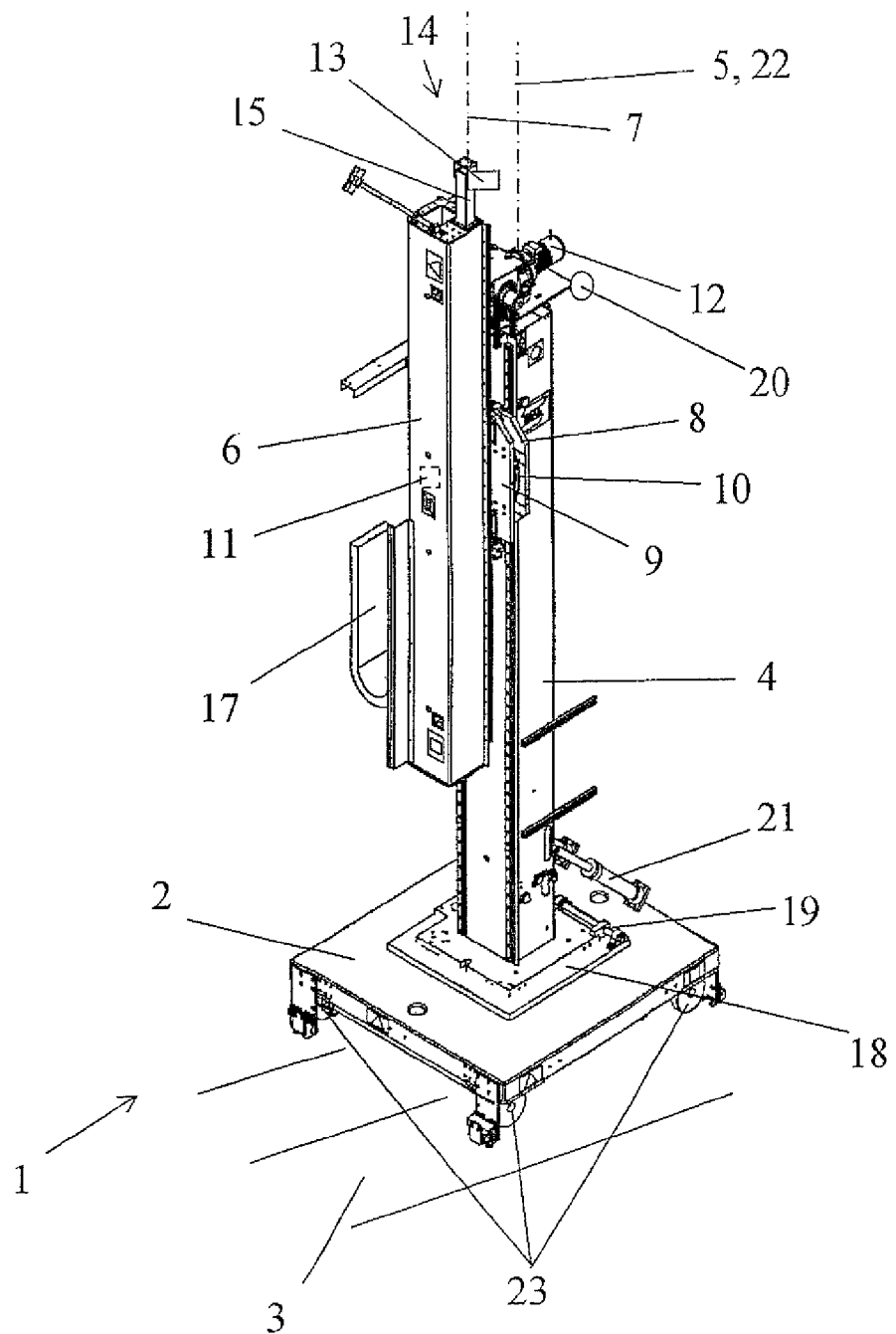
FIG. 4 shows the welding crane of FIG. 1 and FIG. 2 when the boom has been positioned in its second position.

During transport of the welding crane 1, the mast 4 is in its second position substantially parallel with the plane that is defined by the support surface that in its turn is defined by the wheels 23. Also the boom 6 is thereby in its second position parallel with the mast 4. When the welding crane has arrived at the place of operation for the structure which is to be welded together, the base part is first positioned at the correct position and with the support surface that is defined by the wheels 23 in a horizontal plane. In the case that the base part comprises wheels 23, the correct position may be on rails (not shown). Thereafter the mast 4 is folded up to its first position with the longitudinal axis 5 of the mast 4 substantially vertical as is shown in FIG. 4. Finally, the boom 6 is rotated from its second position to its first position in order to obtain the position that is shown in FIG. 1 and FIG. 2.

When the welding is finished, the above described steps are carried out in reverse order.

The described embodiments of a welding crane may of course be modified in many ways without departing from the spirit and scope of the present invention which is only limited by the appended claims.

It is for example possible to let the boom comprise more than two telescopic parts.

It is not necessary to let the base part comprise wheels 23.

The invention claimed is:

1. Welding crane for welding large structures, the welding crane comprising
    a base part which is arranged to be positioned on a ground;
    a mast with a longitudinal axis, wherein the mast's longitudinal axis can be arranged in at least a first position to extend substantially vertically from the base part;
    a first member arranged on the mast, the first member displaceable along the mast's longitudinal axis, the first member arranged to run in a track on the mast; and
    a boom with a longitudinal axis, the boom is arranged on the mast, the boom's longitudinal axis can be arranged in at least a first position substantially perpendicular to the mast's longitudinal axis, and the boom arranged for receiving a welding head in a first end;
    a second member, wherein the boom is arranged on the second member, the second member rotatably arranged in relation to the first member, such that the second member is rotatable in relation to the first member and in relation to the mast, wherein said rotation of the second member in relation to the first member and in relation to the mast provides rotation of the boom in relation to the mast;
    wherein rotation of the second member in relation to the first member and in relation to the mast causes a rotation of the boom relative to the mast's longitudinal axis,
    wherein the boom is rotatable in relation to the mast such that the boom can be rotated to a second position in which the boom's longitudinal axis is substantially parallel with the mast's longitudinal axis; and
    wherein the crane further comprises support wheels positioned on a distal end of the mast, the support wheels configured to support the mast when the boom is in the second position and the mast is rotated so that the longitudinal axis of the mast is parallel with an upper surface of the base part.

2. Welding crane according to claim 1, wherein the boom is rotatable from the first position, where the boom's longitudinal axis is substantially perpendicular to the mast's longitudinal axis, to the second position where the boom's longitudinal axis is substantially parallel with the mast's longitudinal axis.

3. Welding crane according to claim 2, wherein the first member, in arrangement with the second member and boom, is displaceable along the mast's longitudinal axis.

4. Welding crane according to claim 2, wherein the second member is connected to the first member with a roller path bearing.

5. Welding crane according to claim 1, wherein the boom is displaceable perpendicularly to the longitudinal axis of the mast.

6. Welding crane according to claim 5, wherein the boom can be telescopically pulled out along its longitudinal axis.

7. Welding crane according to claim 1, wherein the base part comprises support points which define a support surface, which is arranged to be positioned substantially in a horizontal plane and wherein the mast is arranged such that it can be folded from the first position to the second position in which the longitudinal axis of the mast is substantially parallel with the support surface.

8. Welding crane according to claim 7, wherein the mast is provided with support wheels at a distal end thereof.

9. Welding crane according to claim 1, comprising a mast base member on which the mast is arranged and in relation to which the mast can be folded, wherein the mast base member is rotatable in relation to the base part around a rotational axis which is perpendicular to the support surface.

10. Welding crane according to claim 1, wherein the base part is provided with wheels.

11. Welding crane according to claim 1, wherein the first member comprises a first plate arranged on the mast, the first plate displaceable along the mast's longitudinal axis, and wherein the second member comprises a second plate arranged on the boom, a roller bearing rotationally connecting the first plate to the second plate providing rotation of the boom about the mast's longitudinal axis between a first position in which the longitudinal axis of the boom is substantially perpendicular to the longitudinal axis of the mast and a second position in which the longitudinal axis of the boom is substantially parallel with the longitudinal axis of the mast.

12. Welding crane according to claim 1, wherein the first member comprises a first plate displaceable along the mast's longitudinal axis, and wherein the second member comprises a second plate arranged on the boom, the first plate and the second plate oriented parallel with respect to each other.

13. Welding crane according to claim 12, wherein the second plate is displaceable along the longitudinal axis of the boom.

14. Welding crane according to claim 1, further comprising a hinge disposed between the mast and the base part, the mast rotatable with respect to the base part via the hinge.

15. Welding crane for welding large structures, the welding crane comprising
    a base part which is arranged to be positioned on a ground;
    a mast with a longitudinal axis, wherein the mast's longitudinal axis can be arranged in at least a first position to extend substantially vertically from the base part;
    a first member arranged on the mast, the first member displaceable along the mast's longitudinal axis, the first member arranged to run in a track on the mast;
    a boom with a longitudinal axis, the boom is arranged on the mast, the boom's longitudinal axis can be arranged in at least a first position substantially perpendicular to the mast's longitudinal axis, and the boom arranged for receiving a welding head in a first end; and
    a second member, wherein the boom is arranged on the second member, the second member rotatably arranged in relation to the first member, such that the second member is rotatable in relation to the first member and in relation to the mast, wherein said rotation of the second member in relation to the first member and in relation to the mast provides rotation of the boom in relation to the mast;
    wherein rotation of the second member in relation to the first member and in relation to the mast causes a rotation of the boom relative to the mast's longitudinal axis, wherein the boom is rotatable in relation to the mast such that the boom can be rotated to a second position in which the boom's longitudinal axis is substantially parallel with the mast's longitudinal axis;
    wherein the first member comprises a first plate displaceable along the mast's longitudinal axis, and wherein the second member comprises a second plate arranged on the boom, the first plate and the second plate oriented parallel with respect to each other; and wherein the second plate is displaceable along the longitudinal axis of the boom.

16. Welding crane according to claim 15, wherein the boom is rotatable from the first position, where the boom's longitudinal axis is substantially perpendicular to the mast's longitudinal axis, to the second position where the boom's longitudinal axis is substantially parallel with the mast's longitudinal axis.

17. Welding crane according to claim 16, wherein the first member, in arrangement with the second member and boom, is displaceable along the mast's longitudinal axis.

18. Welding crane according to claim 16, wherein the second member is connected to the first member with a roller path bearing.

19. Welding crane according to claim 15, wherein the boom is displaceable perpendicularly to the longitudinal axis of the mast.

20. Welding crane according to claim 19, wherein the boom can be telescopically pulled out along its longitudinal axis.

\* \* \* \* \*